June 21, 1949. H. EDELS 2,473,871
ELECTRIC ARC WELDING
Filed June 18, 1946
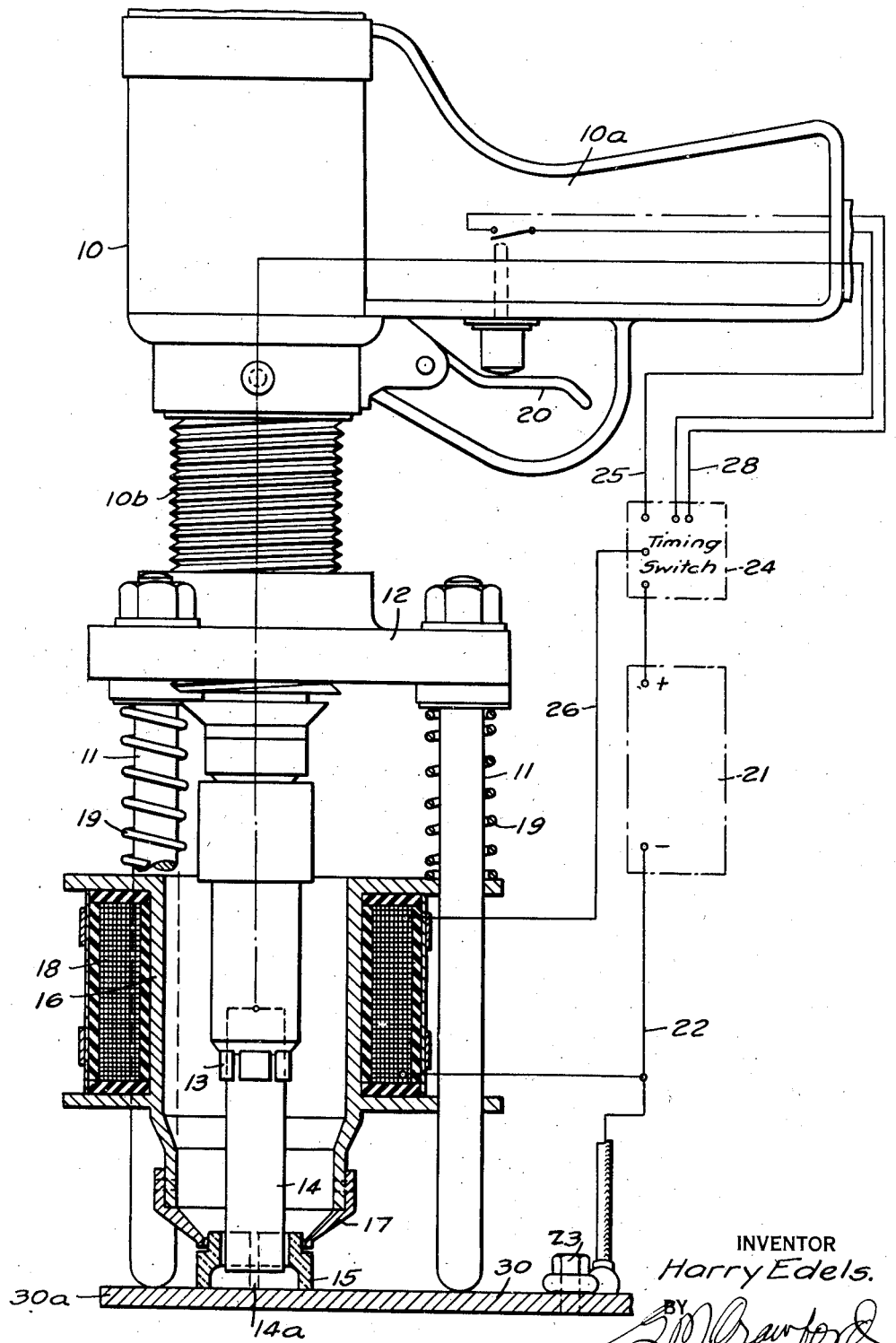
INVENTOR
Harry Edels.
BY
ATTORNEY Patented June 21, 1949

2,473,871

UNITED STATES PATENT OFFICE 2,473,871

ELECTRIC ARC WELDING

Harry Edels, Stafford, England, assignor to The English Electric Company Limited, London, England, a British company Application June 18, 1946, Serial No. 677,483
In Great Britain June 18, 1945

6 Claims. (Cl. 219—4)

This invention relates to electric arc welding, and finds particular application when direct current is used in the process known as stud welding. In this process a stud is held in a gun with its end near to a metal surface to which the stud is to be welded, and an arc is struck between the stud and the surface. After a short interval the metal of the surface becomes molten, and the electric current is then cut off and the end of the stud is plunged into the pool of molten metal.

When studs are welded to ferromagnetic surfaces near their edges, the arc becomes asymmetrical with the result that the weld itself is asymmetrical and lacks strength. A similar result occurs if the stud is welded to a metallic surface near to a point where a current lead is fixed to the surface to provide the return path for the welding current.

The principal object of the present invention is to provide means for the reduction or elimination of asymmetry in the welds. According to a principal feature of the invention a strong symmetrical magnetic field is produced coaxial along the direction of the arc in the space occupied by the arc, and spreading radially therefrom in the surface to which the stud is to be welded. It is believed that the effect of this field is to produce magnetic saturation in proximity to the arc in the surface to which the stud is to be welded, and thereby to reduce or eliminate the asymmetry of the resultant magnetic field.

The invention will be further described by way of example with reference to its application in a manually operable stud welding gun, an elevation of which is shown in the accompanying drawing.

In the stud welding gun shown in the drawing, the body 10 is so formed as to provide a pistol-grip handle 10a and carries a trigger 20 to operate a switch to initiate a weld. The body 10 has also a threaded extension 10b which supports a tripod consisting of a nut member 12 carrying three parallel legs 11.

A steel stud 14 is shown in position in the gun ready for the commencement of welding to a steel plate 30, near to the edge 30a thereof. The stud 14 is carried in a stud holder 13 which is vertically slidable in the body 10, but which is biassed downward relative thereto.

A porcelain ferrule 15 is shown in position surrounding the stud 14. This ferrule 15, which serves to prevent arc splatter, is located by a nose piece 17 which is attached by a bayonet fitting to the end of ferrule-locating member 16. Member 16 is slidably mounted on the legs 11 of the tripod, and is lightly pressed downwards by springs 19. Members 16 and 17 are both of non-magnetic material. Upon member 16 as a former, there is wound a coil 18 of insulated wire.

The source of direct current for welding is diagrammatically indicated at 21. Its negative terminal is directly connected through a current return lead 22 to a terminal 23 fastened to plate 30. The positive terminal of source 21 is connected through a timing switch 24, from which a lead 25 carries the welding current through the end of the handle 10a and by an insulated path within the body 10 to stud holder 13. Timing switch 24 is controlled by trigger 20 operating through a switch within handle 10a and through leads 28.

The coil 18 is also supplied with direct current from source 21 through timing switch 24, and through lead 26 which is energised by timing switch 24 simultaneously with lead 25.

When the stud 14 is to be welded to plate 30, it is fitted into stud holder 13 as shown, and nose piece 17 is engaged with ferrule 15 which is resting upon plate 30. The body 10 is then pressed down, compressing springs 19, until the feet of legs 11 are resting upon plate 30.

The trigger 20 is now pressed to operate timing switch 24 and cause direct current to be supplied from source 21 for a measured period, which will be less than a second, through stud 14 to plate 30 for welding, and simultaneously through coil 18. A small pip 14a at the bottom of the stud 14 rapidly fuses, but meanwhile clamping mechanism within the body 10 of the gun is operated by the flow of current to fix stud holder 13 relative to tripod legs 11. The spacing between the end of stud 14 and the surface of plate 30 is therefore maintained constant, after pip 14a has fused, throughout the period during which the flow of welding current continues. When the currents are cut off by timing switch 24, the clamping mechanism within body 10 is released and the bias forces stud holder 13 downwards relative to tripod legs 11 and so forces the lower end of stud 14 into the molten pool on the surface of plate 30 inside ferrule 15.

The direct current flowing in coil 18 throughout the duration of the flow of welding current produces a strong magnetic field which passes in the direction of the arc through the space occupied by the arc and then spreads radially, and symmetrically, in the plate 30. This field will overcome any asymmetry which would have been present, in the absence of current through coil 18, in the field produced by the welding current in proximity to the arc.

When welding steel studs of the order of ¼" to ½" diameter, and 1½" to 2½" long, to a steel plate of thickness about ⅜", it has been found most satisfactory to use a coil of about 500 turns carrying current to give about 2200 ampere-turns, the mean diameter of the coil being about 2¼" and its length 1½", and the lower end of the coil being spaced about 1¾" from the surface of the plate.

The invention is of course applicable in welding, to surfaces, articles which would not be regarded as "studs" in any narrow sense of that term. The expression "pillars" is used in the claims hereof to denote such articles generally, and they may be short or long and may, for example, be square or polygonal in cross-section, and they may be hollow or alternatively they may be solid.

Similarly, the surface to which the pillars are welded may be a plate or the surface of a thick body; it need not necessarily be flat, and it may, for example, have a hole or recess to receive the pillar or the end thereof.

What I claim as my invention and desire to secure by Letters Patent is:

1. Welding apparatus for arc welding a pillar to a ferro-magnetic surface, in a position near to the edge of the surface, comprising support means disposed to engage said surface, holding means for the pillar movable on the support means, and means to render substantially symmetrical the magnetic field in the surface material in immediate proximity to the arc, including an electromagnet slidably mounted on the support means.

2. Welding apparatus for arc welding a pillar to a ferro-magnetic surface, comprising support means disposed to engage the surface, a ferrule locating member slidably mounted on the support means, and means including a winding supported on the ferrule locating means disposed to produce a saturating magnetic field in the surface material in immediate proximity to the arc.

3. Welding apparatus for arc welding a pillar to a ferro-magnetic surface, including a support disposed to engage the surface, a pillar holder movable on the support to engage the surface, a coil disposed coaxially around the pillar, and slidable relative to the pillar holder and means to pass a direct current through said coil during welding.

4. A stud welding gun having a stud holder, a ferrule locating member slidable axially of the gun independently of the stud holder and a coil positioned on the ferrule locating member and arranged coaxially around said stud holder for producing a magnetic field about the stud.

5. A stud welding gun having a body with a support for engaging a surface, a stud holder slidably mounted on said body to position a stud relative to said surface, and a coil disposed to provide a magnetic field about the stud independently mounted on said support so as to be slidable parallel to said stud holder and coaxial therewith.

6. A stud welding gun having a stud holder, a ferrule-locating member surrounding said stud holder and slidable coaxially relative thereto, and a current coil coaxially mounted on said ferrule-locating member and extending beyond the stud holder.

HARRY EDELS.

REFERENCES CITED

The following references are of record in the file of this patent:

UNITED STATES PATENTS

| Number | Name | Date |
|---|---|---|
| 1,246,658 | Reid | Nov. 13, 1917 |
| 1,906,496 | Stine et al. | May 2, 1933 |
| 2,110,832 | Hogg et al. | Mar. 8, 1938 |
| 2,406,474 | Perrin | Aug. 27, 1946 |
| 2,413,189 | Nelson | Dec. 24, 1946 |